(12) United States Patent
Dybsetter et al.

(10) Patent No.: US 7,543,176 B2
(45) Date of Patent: Jun. 2, 2009

(54) BACKGROUND CONSISTENCY CHECKING IN AN OPTICAL TRANSCEIVER

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 511 days.

(21) Appl. No.: 11/320,034

(22) Filed: Dec. 28, 2005

(65) Prior Publication Data

US 2006/0147216 A1 Jul. 6, 2006

Related U.S. Application Data

(60) Provisional application No. 60/640,622, filed on Dec. 30, 2004.

(51) Int. Cl.
*G06F 11/00* (2006.01)

(52) U.S. Cl. .................... 714/6; 714/718; 714/719

(58) Field of Classification Search .............. 714/6, 714/718, 719
See application file for complete search history.

(56) References Cited

U.S. PATENT DOCUMENTS

| | | | | |
|---|---|---|---|---|
| 5,978,952 A * | 11/1999 | Hayek et al. | ................. | 714/764 |
| 6,076,183 A * | 6/2000 | Espie et al. | ................. | 714/764 |
| 6,446,145 B1 * | 9/2002 | Har et al. | ..................... | 710/68 |
| 2002/0016942 A1 * | 2/2002 | MacLaren et al. | ........... | 714/718 |
| 2003/0097608 A1 * | 5/2003 | Rodeheffer et al. | ............ | 714/7 |
| 2004/0022537 A1 | 2/2004 | Mecherle et al. | .............. | 398/41 |
| 2006/0007905 A1 * | 1/2006 | Yach et al. | .................. | 370/342 |
| 2007/0079185 A1 * | 4/2007 | Totolos, Jr. | ................. | 714/718 |

OTHER PUBLICATIONS

U.S. Appl. No. 11/074,109, filed Mar. 7, 2005, Dybsetter, et al.
U.S. Appl. No. 11/073,827, filed Mar. 7, 2005, Dybsetter, et al.

* cited by examiner

*Primary Examiner*—Bryce P Bonzo
(74) *Attorney, Agent, or Firm*—Workman Nydegger

(57) ABSTRACT

A method that enables an optical transceiver (or optical transmitter or optical receiver) to perform consistency checking such as Cyclic Redundancy Checking (CRC) in the background while the transceiver is in operation. The optical transceiver includes a system memory and a consistency checker component. The optical transceiver determines that consistency checking is to be performed and identifies non-contiguous static portions of the system memory to be checked. The consistency checker reads the non-contiguous static portions of system memory and determines whether or not the portions of system memory are consistent with an expected consistency check value.

20 Claims, 2 Drawing Sheets

BACKGROUND CONSISTENCY CHECKING IN AN OPTICAL TRANSCEIVER

CROSS-REFERENCE TO RELATED APPLICATIONS

This application claims the benefit of U.S. Provisional Application No. 60/640,622, filed Dec. 30, 2004, which is incorporated herein by reference in its entirety. This application is also related to U.S. patent application Ser. No. 11/073,886, filed Mar. 7, 2005 entitled "Consistency Checking over Internal Information in an Optical Transceiver" which is also incorporated herein by reference in its entirety.

BACKGROUND OF THE INVENTION

1. The Field of the Invention

The present invention relates generally to consistency checking. More specifically, the present invention relates to optical transceivers that perform background consistency checking on information stored in internal memory.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

What would be advantageous is to improve the reliability of such a controller when operating to control the various features of the optical transceiver.

BRIEF SUMMARY OF THE INVENTION

The forgoing problems with the prior state of the art are overcome by the principles of the present invention, which relate to consistency checking in an optical transceiver while the optical transceiver is in operation. The optical transceiver includes a system memory and a consistency checker component that is configured to perform consistency checking.

While operating, the optical transceiver determines that consistency checking is to be performed. This may be accomplished by the consistency checker component identifying one or more non-contiguous static portions of the system memory that are to be subjected to consistency checking. The consistency checker component then reads the data stored in the identified memory locations. Finally, the consistency checker determines if the data from the identified memory locations is consistent with an expected value. Accordingly, the optical transceiver is able to perform consistency checking on its internally stored data, even when operating for long periods of time. This helps ensure that a long running transceiver will not continue to operate if the data in memory has become corrupt. If an error is found, the transceiver is able to internally take remedial action.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to a method that enables an optical transceiver (or optical transmitter or optical receiver) to perform consistency checking such as Cyclic Redundancy Checking (CRC) in the background while the transceiver is in operation. The optical transceiver includes a system memory and a consistency checker component. The optical transceiver determines that consistency checking is to be performed and identifies non-contiguous static portions of the system memory is to be checked. The consistency checker component reads the non-contiguous static portions of system memory and determines whether or not the portions of system memory are consistent with an expected consistency check value. An example operational optical transceiver environment will first be described. Then, the operation in accordance with the invention will be described with respect to the operational environment.

Figure 1:
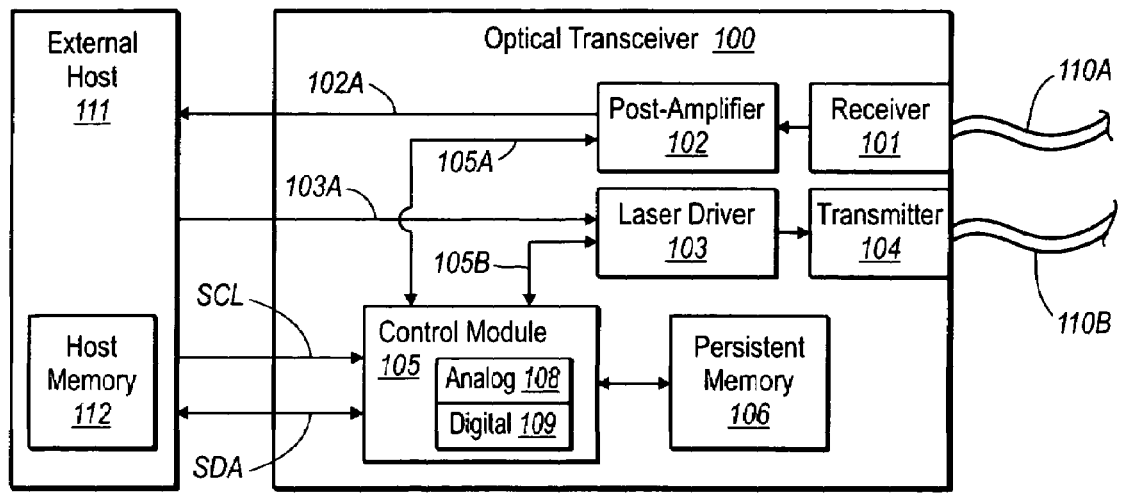
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 10B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 1110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
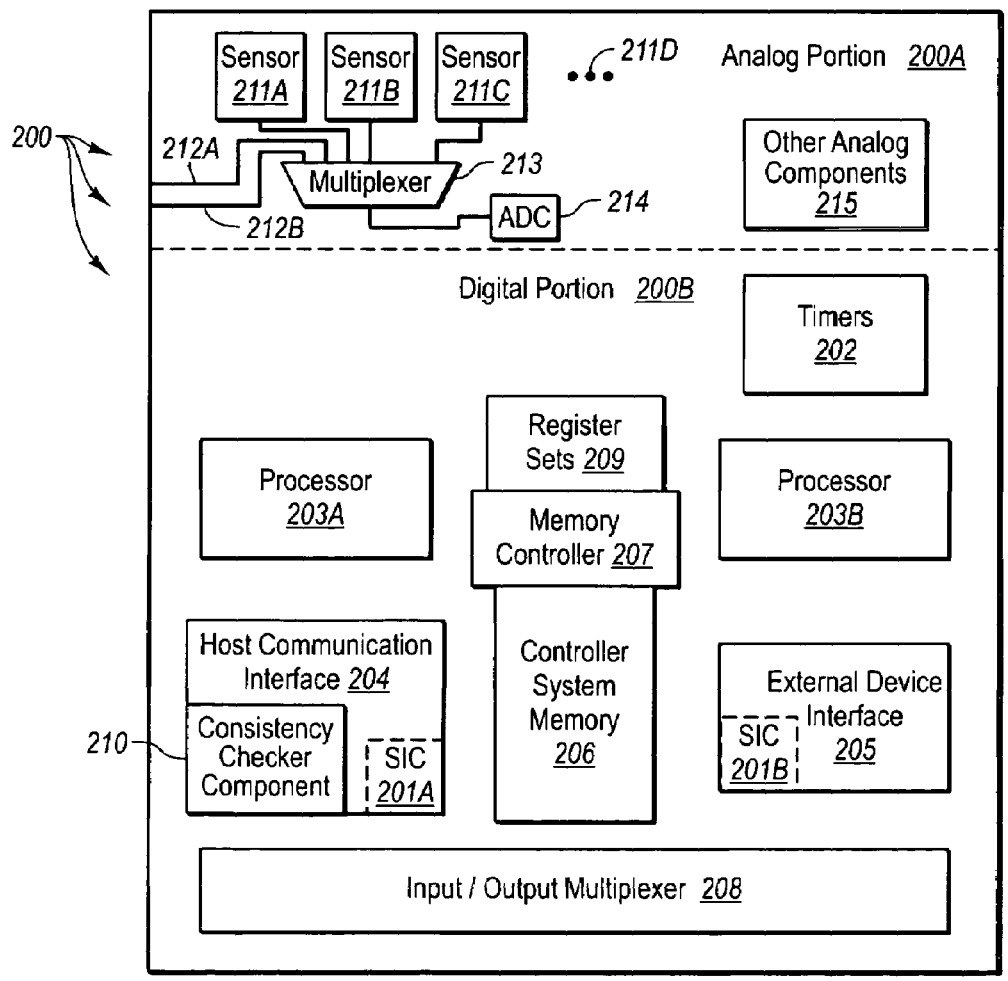
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver (or optical transmitter or optical receiver) that is configured to perform background consistency checking while the optical transceiver is in operation. The principles of the present invention will be discussed with reference to the environment described in relation to FIGS. 1 and 2.

Consistency checking consists of a common technique for detecting data transmission errors over a transmission channel or data retention errors in storage. Perhaps the most common type of consistency checking is Cyclic Redundancy Checking (CRC). In order to perform CRC checking, the transceiver performs an algorithm on static segments of the data in the system memory (or the data as a whole), and generates a consistency check value. The algorithm is such that the actual consistency check value generated should remain the same, no matter how many times the algorithm is applied against the data, so long as the data has not changed, and such that if the data has changed, the calculated consistency check value will also likely change.

Once the algorithm is applied against the data, the calculated consistency check value is compared against an expected consistency check value. If the consistency check values do not match, an error is detected. The present invention provides a method of configuring a transceiver to perform background consistency checking of static portions of the system memory during operation. This allows for error detection in the system memory during operation without affecting the regular operation of the transceiver. Furthermore, since designated portions of memory may be identified as being subjects for background consistency checking, the scarce background processing resources may be devoted more towards data that is more critical to the operation of the optical transceiver.

In order to perform consistency checking, it is necessary to implement a consistency checker component. In the claims and in the description, "consistency checker component" is defined as any hardware, software, or any combination of the two that is capable of reading a static portion of memory (e.g., in response to executing microcode or in response to some other signal(s)) and determining whether or not the contents of the portion of memory are consistent with an expected value. This may include, but is not limited to, a specific consistency checker device, a state machine, firmware, or a general microprocessor.

Referring to FIG. 2, a host communication interface 204 is illustrated. In addition to the functionality described previously, host communication interface 204 may also contain a consistency checker component 210. However, the consistency checker component may also be implemented in other parts of transceiver 100.

Consistency checker component 210 performs consistency checking on non-contiguous static portions portions of controller system memory 206. While controller system memory 206 may be RAM as previously described, it may also be a processor, a register, a flip-flop, non-volatile memory (such as persistent memory 106), or any other memory device. The static portions of system memory may, for example, contain information that is more critical to the operation of the optical transceiver, and which generally does not change during the normal course of operation.

Figure 3:
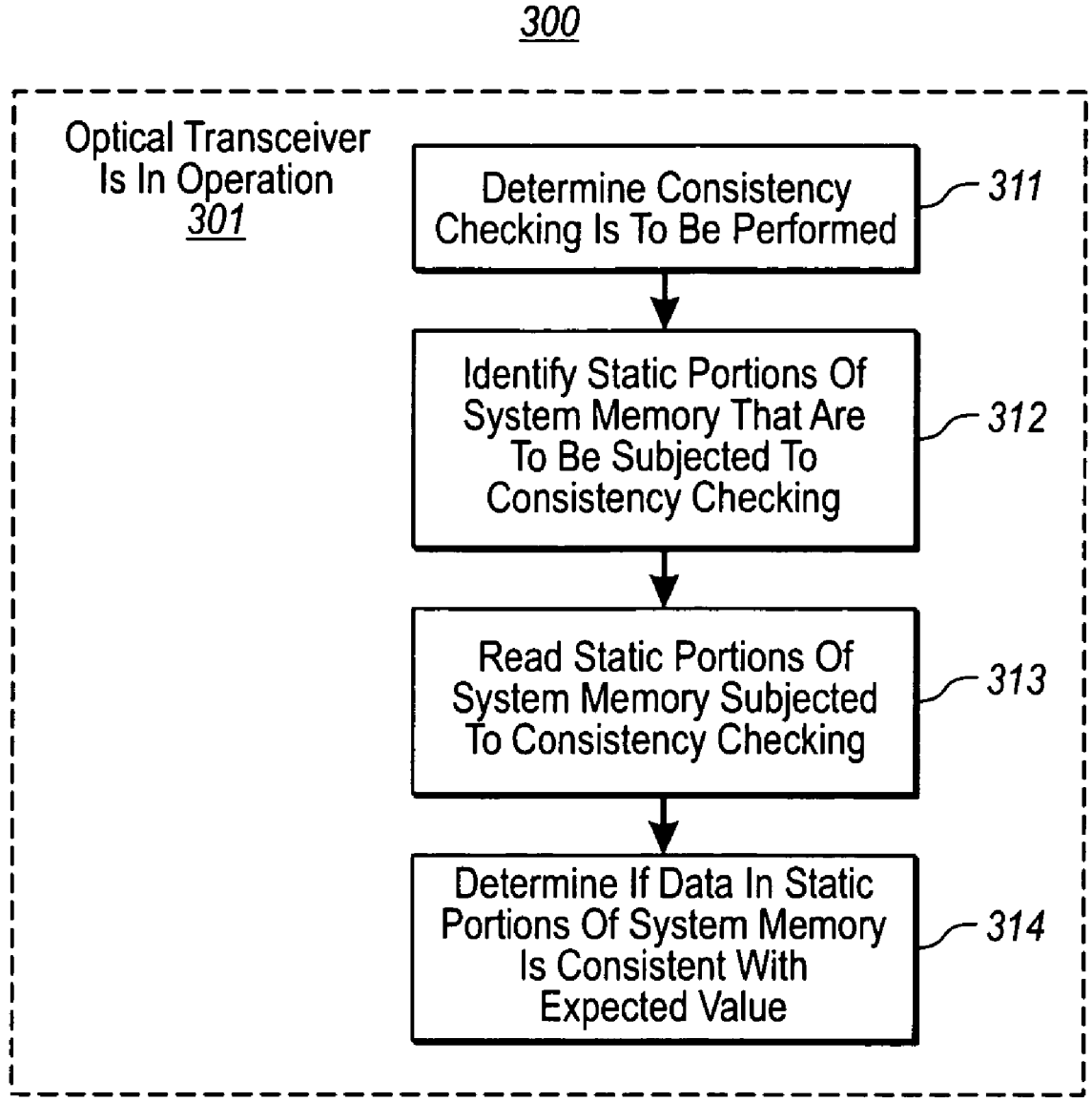
FIG. 3 illustrates a method for performing background consistency checking in accordance with the principles of the present invention.

Referring to FIG. 3, a flowchart of a method 300 for an optical transceiver such as optical transceiver 100 to perform consistency checking on static portions of a system memory is illustrated. The method 300 may be performed by, for example, the consistency checker component, although the performance of the method may be distributed throughout other components of the optical transceiver as well.

The consistency checker component may be configured to perform consistency checking while the optical transceiver is in operation (act 301). In the claims and in this description, "operation" is defined as a period of time when the optical transceiver is turned on, but excluding the boot process. This definition includes when transceiver 100 is receiving or transmitting optical signals. It may also include when transceiver 100 is communicating with host 111. It may even include when the transceiver is turned on and not communicating with an outside source. Thus, when consistency checking is performed while transceiver 100 is performing other operations such as receiving or transmitting optical signals, the consistency checking may be considered to occur in the background.

While in operation, it is determined that consistency checking is to be performed on controller system memory 206 (act 311). For example, consistency checker component 210 may initiate the background consistency checking anytime new microcode is loaded and executed in controller system memory 206. In some embodiments, consistency checker component 210 may be configured to perform background consistency checking anytime transceiver 100 is in operation. Alternatively, host 111 or the processors 203 may direct that consistency checker component 210 initiate background consistency checking. Consistency checking may also be performed at designated intervals.

In other embodiments, consistency checker component 210 may be configured to turn off the consistency checking when directed by host 111 or processors 203. This may be done when background processing resources in the optical transceiver are needed for other crucial transceiver operations. Later, when the background processing resources are freed up, host 111 or the processors 203 may direct consistency checker component 210 to resume the background consistency checking.

Consistency checker component 210 may then identify one or more static portions of controller system memory 206 that are to be subjected to consistency checking (act 312). In some embodiments, a register in register sets 209 or a portion of the system memory 206 contains a memory-check table that identifies the locations of the non-contiguous static portions of memory to be checked. The memory-check table may contain the memory location address, length of static data in the memory location, and an expected consistency check value such as a CRC checksum. There may be other ways that consistency checker component 210 may identify the static portions of system memory to consistency check.

Consistency checker component 210 may then read at least one of the one or more portions of system memory 206 that are to be subjected to consistency checking (act 313). The static memory locations may be read all at one time or one or more locations at a time. In embodiments implementing the memory-check table, use of the memory-check table allows the consistency checker component to read the static portions while bypassing any non-static portions that may be interleaved between the static portions.

Finally, the consistency checker component 210 determines if the data from the static portions of controller system memory 206 are consistent with an expected consistency check value (act 314). For example, in a CRC operation, consistency checker component 210 generates an actual consistency check value (e.g., a CRC checksum) by applying a CRC algorithm to the data read from the static portion. The resulting CRC checksum is then compared against a known CRC checksum found in the memory-check table. If the values are not the same, the consistency checker component 210 may be alerted to the fact that an error or degradation of the controller system memory 206 has occurred and may take remedial action. If, on the other hand, the values are the same, then no error is indicated in the controller system memory 206.

In some embodiments, consistency checker component 210 will take remedial action upon determining that the static portions of controller system memory 206 are not consistent with an expected consistency check value. For example, consistency checker component 210 may report the error to host 111 using the serial data line SDA or other implemented host interface. Informing the host allows for transceiver 100 user analyses. In other embodiments, consistency checker component 210 may initiate a warm reboot process. In the description and in the claims, "warm reboot" is defined to mean loading data from a persistent memory source into system memory after an optical transceiver has been in operation for a period of time. A warm reboot allows correct data from persistent memory 106 to overwrite the error in controller system memory 206. Consistency checker component 210 may be configured to self-initiate the warm reboot process. Alternatively, consistency checker component 210 may report the error to processors 203, thus allowing the processors to initiate the reboot process. Additionally, host 111 may initiate the reboot process on receiving the error report from the consistency checker component 210. In this way, a long running optical transceiver is protected from memory degradation as the optical transceiver may initiate a warm reboot whenever a memory error is detected.

Accordingly, the principles of the present invention provide for an optical transceiver that performs background consistency checking of data in the system memory. This allows for error checking during the operation of the optical transceiver. Any consistency errors can be caught and reported to the host. Alternatively, the transceiver can be rebooted or perform any other action that would be advantageous upon detecting the error. This helps to prevent the execution of corrupt data and helps to prevent damage to the transceiver. Accordingly, the principles of the present invention are a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver including a system memory and a consistency checker component, a method for the consistency checker component to check portions of system memory for consistency error during operation of the optical transceiver, the method comprising:

an act of operating the optical transceiver, wherein operating the optical transceiver includes at least one of transmitting optical signals, receiving optical signals, or communicating with a host device coupled to the optical transceiver;

during the act of operating the optical transceiver, an act of performing the following:

an act of determining that consistency checking is to be performed on one or more portions of the system memory;

in response to the act of determining that consistency checking is to be performed, an act of the consistency checker component identifying one or more portions of the system memory that are to be subjected to consistency checking;

an act of the consistency checker component reading at least one of the one or more portions of the system memory that are to be subjected to consistency checking; and an act of the consistency checker component determining whether or not data from the at least one of the one or more portions of system memory is consistent with an expected consistency check value.

2. A method in accordance with claim 1, wherein the act of the consistency checker component determining whether or not the data in the at least one of the one or more portions of system memory is consistent with an expected consistency check value comprises the following:
  an act of the consistency checker component determining that the specified data does not have the expected consistency check value; and
  an act of the consistency checker component initiating an optical transceiver warm reboot process.

3. A method in accordance with claim 1, wherein the act of the consistency checker component determining whether or not the data in the at least one of the one or more portions of system memory is consistent with an expected consistency check value comprises the following:
  an act of the consistency checker component determining that the specified data does not have the expected consistency check value; and
  an act of the consistency checker component conveying this information to a host computing system coupled to the optical transceiver.

4. A method in accordance with claim 1, wherein the consistency checker component is a processor.

5. A method in accordance with claim 1, wherein the consistency checker component is a state machine.

6. A method in accordance with claim 1, wherein the system memory further has thereon a memory-check table, and the act of the consistency checker component identifying one or more portions of the system memory that are to be subjected to consistency checking further comprises:
  an act of reading a first entry in the memory-check table, the first entry identifying a first static portion of the system memory; and
  an act of reading a second entry in the memory-check table, the second entry identifying a second static portion of the system memory.

7. A method in accordance with claim 1, wherein the act of the consistency checker component determining whether or not data from the at least one of the one or more portions of system memory is consistent with an expected consistency check value comprises:
  an act of performing a Cyclic Redundancy Checking (CRC) computation.

8. An optical transmitter comprising:
  a system memory, the system memory including a plurality of static portions that are to be subjected to consistency checking and plurality of non-static portions that are not to be subjected to consistency checking, the static portions being interleaved with the non-static portions such that the static portion are non-contiguous;
  a consistency checker component configured to perform consistency checking on one or more of the static portions of system memory, wherein the consistency checking comprises:
    operating the optical transmitter, wherein operating the optical transmitter includes at least one of transmitting optical signals or communicating with a host device coupled to the optical transmitter;
    while operating the optical transmitter:
      determining that consistency checking is to be performed on one or more static portions of the system memory;
      reading at least one of the one or more static portions of the system memory that are to be subjected to consistency checking; and
      determining whether or not the data from the at least one of the one or more static portions of system memory is consistent with an expected consistency check value.

9. An optical transmitter in accordance with claim 8, wherein the consistency checking further comprises:
  determining that the specified data does not have the expected consistency check value; and
  initiating an optical transmitter warm reboot process.

10. An optical transmitter in accordance with claim 8, wherein the consistency checking further comprises:
  determining that the specified data does not have the expected consistency check value; and
  conveying this information to a host computing system coupled to the optical transmitter.

11. An optical transmitter in accordance with claim 8, wherein the consistency checker component is a processor.

12. An optical transmitter in accordance with claim 8, wherein the consistency checker component is a state machine.

13. An optical transmitter in accordance with claim 8, wherein the system memory further has thereon a memory-check table, and the consistency checking further comprises:
  reading a first entry in the memory-check table, the first entry identifying a first static portion of the system memory; and
  reading a second entry in the memory-check table, the second entry identifying a second static portion of the system memory.

14. An optical transmitter in accordance with claim 8, wherein the consistency checking comprises:
  performing a Cyclic Redundancy Checking (CRC) computation.

15. An optical receiver comprising:
  a system memory, the system memory including a plurality of static portions that are to be subjected to consistency checking and plurality of non-static portions that are not to be subjected to consistency checking, the static portions being interleaved with the non-static portions such that the static portion are non-contiguous;
  a consistency checker component configured to perform consistency checking on one or more of the static portions of system memory, wherein the consistency checking comprises:
    operating the optical receiver, wherein operating the optical receiver includes at least one of receiving optical signals or communicating with a host device coupled to the optical receiver;
    while operating the optical receiver:
      determining that consistency checking is to be performed on one or more static portions of the system memory;
      reading at least one of the one or more static portions of the system memory that are to be subjected to consistency checking; and
      determining whether or not the data from the at least one of the one or more static portions of system memory is consistent with an expected consistency check value.

16. An optical receiver in accordance with claim 15, wherein the consistency checking comprises:
  performing a Cyclic Redundancy Checking (CRC) computation.

17. An optical receiver in accordance with claim 15, wherein the consistency checking further comprises:
  determining that the specified data does not have the expected consistency check value; and
  initiating an optical transmitter warm reboot process.

18. An optical receiver in accordance with claim 15, wherein the consistency checking further comprises:

determining that the specified data does not have the expected consistency check value; and conveying this information to a host computing system coupled to the optical transmitter.

19. An optical receiver in accordance with claim 15, wherein the consistency checker component is one of a processor or a state machine.

20. An optical receiver in accordance with claim 15, wherein the system memory further has thereon a memory-check table, and the consistency checking further comprises:

reading a first entry in the memory-check table, the first entry identifying a first static portion of the system memory; and reading a second entry in the memory-check table, the second entry identifying a second static portion of the system memory.

\* \* \* \* \*

UNITED STATES PATENT AND TRADEMARK OFFICE
CERTIFICATE OF CORRECTION

PATENT NO. : 7,543,176 B2  
APPLICATION NO. : 11/320034  
DATED : June 2, 2009  
INVENTOR(S) : Dybsetter et al.

Page 1 of 1

It is certified that error appears in the above-identified patent and that said Letters Patent is hereby corrected as shown below:

Column 3
Line 30, change "10B" to --110B--
Line 34, change "1110B" to --110B--

Signed and Sealed this

Nineteenth Day of October, 2010

David J. Kappos
*Director of the United States Patent and Trademark Office*